Patented Nov. 2, 1943

2,333,151

UNITED STATES PATENT OFFICE 2,333,151

SANDSTONE PRODUCT

James A. Campbell, Adrian, Mich., assignor to Kewaunee Manufacturing Company, Adrian, Mich., a corporation of Michigan No Drawing. Application April 27, 1942, Serial No. 440,677

4 Claims. (Cl. 117—123)

The present invention relates to new articles of manufacture and the method of preparing the same. While not limited to any particular use, the articles of the present invention have been found to have special utility in the chemical laboratory furniture field, e. g. as table tops, hoods, sinks and the like.

Laboratory furniture is subjected to destructive attack from almost every known chemical and physical source. It is not only necessary that the furniture withstand the action of innumerable acid, alkali and solvent chemicals, but it must also withstand heat, abrasion and shock. Many different substances have been employed in the past including stone, asbestos, sheet lead, wood coated with chemically resistant materials, etc. While such materials have proven satisfactory for use in certain cases, they have been found unsatisfactory in other applications. The art has long desired improved products for use in the laboratory furniture field.

It is the principal object of the present invention to provide articles or products having special utility in the laboratory furniture field.

It is also an object of the present invention to provide a commercially satisfactory method of preparing improved products possessing the essential characteristics for use as laboratory table tops, hoods, sinks and the like.

Other objects of the present invention will be apparent as the detailed description proceeds.

I have discovered that improved products of the type desired may be satisfactorily prepared by impregnating a substantially dry porous sandstone with a water stabilized acid furan mixture. This mixture, which for present purposes is made up of a water saturated, acid catalyzed, 40–90% furfuraldehyde —10–60% furfuralcohol solution, is described in detail in the co-pending application of Edward A. Reineck, Serial No. 438,215 filed on April 9, 1942.

In the research investigation of the present invention it was discovered that the furan composition described in the above Reineck application could not be satisfactorily used to impregnate all types of substances. Certain materials, for example, were found to be "antagonistic" to the furan mixture and products impregnated with the mixture were found to lack desired characteristics. Certain chemical pre-treatments of materials to be impregnated were then developed in an effort to overcome the impregnating difficulties. While such procedures were found satisfactory for use in certain applications, the prior chemical "conditioning treatments" increased the cost of operation and were found unsatisfactory in other applications.

With continued research I discovered that the water saturated acid furan mixtures were particularly adaptable for use with sandstone and that the impregnation could be carried out without chemical pre-treatments of the sandstone. I also discovered that the acidic water saturated furan mixture possessed in the presence of sandstone remarkable penetrating properties. The following example will serve to illustrate the present invention.

To a 2000 cc. mixture containing about 75% furfuraldehyde and 25% furfuralcohol is first added about 225 cc. of water containing about 20 grams of concentrated (96%) sulfuric acid. The mixture is next stirred well until the solution or dispersion is homogeneous. The resulting mixture is then ready for impregnation which may be carried out by soaking at atmospheric pressure or by the use of superatmospheric pressures applied either with or without evacuation of the air from the pores of the sandstone. After impregnation the furan mixture resinifies (i. e., sets to an insoluble hard resin) as the water evaporates. At elevated temperatures (e. g., 250°–300° F.) the resin forms in a few hours whereas at room temperatures the rate of resinification is much slower.

The use of the water stabilized acid furan mixture makes it possible to employ a one-stage impregnating process. This is a great improvement over the prior processes in which the furan ingredients were first impregnated and then followed by a separate acid or catalyst impregnation. The two-stage processes of this type were found necessary in view of the characteristic instability of the catalyzed furan mixtures available heretofore.

At present it is not thoroughly understood why the water saturated acid furan mixture exhibits such a remarkable ability to penetrate sandstone. Investigations, however, indicate that the physical and chemical make up of the sandstone actively cooperates with the acidic water-furan solution to produce impregnation of the type desired. While the water in the furan mixture in this connection is of the essence, care should be taken to exclude excess water. The presence of water above that which is taken up by the furan mixture (i. e. above the saturation point) destroys the essential homogeneous character of the furan system needed in the present invention. The sandstone in this connection should be of the air dried type or be substantially free from excess water. In practice it has been found desirable to remove excess water from quarry sandstone by a heat or pre-baking treatment before impregnation.

The furan resin of the present invention (preferably catalyzed by a mineral acid) undergoes resinification in situ and investigations show that the resulting sandstone product is impervious after curing. The evaporation of the water during the curing period also gives the resin formed in situ a structure of the type desired and results in a product of markedly increased strength. Investigations have also shown the sandstone products of the present invention to possess the desired chemical and heat resistance and to withstand abrasion and thermo shock.

It will be understood that the present invention is not limited to the above illustrative example. Various modifications of the present invention are intended to be covered by the claims annexed hereto.

I claim:

1. The steps in a method of preparing a product having special utility in the laboratory furniture field which comprises impregnating air dry sandstone with a homogeneous dispersion of a water saturated, mineral acid catalyzed furan mixture, and then resinifying the furan in situ by subjecting the impregnated sandstone product to a heat treatment, said furan mixture consisting of about 40–90% furfuraldehyde and 10–60% furfuralcohol.

2. The steps in a method of preparing a product having special utility in the laboratory furniture field which comprises baking quarry sandstone to remove excess water therefrom and impregnating the heat treated sandstone with a homogeneous dispersion of a water saturated, sulfuric acid catalyzed furan mixture, and then resinifying the furan in situ by subjecting the impregnated sandstone product to a heat treatment, said furan mixture consisting of about 75% furfuraldehyde and 25% furfuralcohol.

3. Laboratory furniture comprising sandstone having a furan resin incorporated therein, said resin being formed in situ by resinification of a homogeneous dispersion of a water saturated acid catalyzed 40–90% furfuraldehyde and 10–60% furfuralcohol mixture.

4. Laboratory furniture comprising sandstone having a furan resin incorporated therein, said resin being formed in situ by resinification of a homogeneous dispersion of a water saturated mineral acid catalyzed 75% furfuraldehyde and 25% furfuralcohol mixture.

JAMES A. CAMPBELL.